(12) United States Patent
Wang et al.

(10) Patent No.: US 11,999,844 B2
(45) Date of Patent: Jun. 4, 2024

(54) OPTICALLY CLEAR SHEAR THICKENING FLUIDS AND OPTICAL DISPLAY DEVICE COMPRISING SAME

(71) Applicant: Rohm and Haas Electronic Materials LLC, Marlborough, MA (US)

(72) Inventors: Deyan Wang, Hudson, MA (US); Yixuan Song, Marlborough, MA (US)

(73) Assignee: ROHM AND HAAS ELECTRONIC MATERIALS LLC, Wilmington, DE (US)

( * ) Notice: Subject to any disclaimer, the term of this patent is extended or adjusted under 35 U.S.C. 154(b) by 479 days.

(21) Appl. No.: 17/163,604

(22) Filed: Feb. 1, 2021

(65) Prior Publication Data

US 2021/0277219 A1    Sep. 9, 2021

Related U.S. Application Data

(60) Provisional application No. 62/986,944, filed on Mar. 9, 2020.

(51) Int. Cl.
*C08L 33/06* (2006.01)
*B82Y 20/00* (2011.01)
(Continued)

(52) U.S. Cl.
CPC ............. *C08L 33/066* (2013.01); *C08K 3/36* (2013.01); *C08K 9/06* (2013.01); *C08L 33/064* (2013.01); *C08L 33/068* (2013.01); *C09D 7/62* (2018.01); *C09D 7/67* (2018.01); *C09D 7/80* (2018.01); *C09D 133/064* (2013.01); *C09D 133/066* (2013.01); *C09D 133/068* (2013.01); *G02B 1/14* (2015.01); *B82Y 20/00* (2013.01); *C08K 2201/005* (2013.01); *C08L 2205/02* (2013.01);
(Continued)

(58) Field of Classification Search
None
See application file for complete search history.

(56) References Cited

U.S. PATENT DOCUMENTS 7,226,878 B2    6/2007  Wagner et al.
9,816,788 B2    11/2017 Haq et al.
(Continued)

FOREIGN PATENT DOCUMENTS

CN    1424362 A  *  6/2003
CN    102719065 A  *  10/2012
(Continued)

OTHER PUBLICATIONS https://www.polysciences.com/default/polyethylene-oxide-mw100000, 2016 (Year: 2016).*
(Continued)

*Primary Examiner* — Satya B Sastri

(57) ABSTRACT

There is disclosed an optically clear shear thickening fluid and a protection assembly comprising the optically clear shear thickening fluid. It further relates to uses of the optically clear shear thickening fluid in electronic devices, particularly in optical display devices. The optically clear shear thickening fluid includes: (a) a solid nanoparticle having an average particle size equal to or less than 100 nm; (b) at least one polymer; and (c) a liquid medium. The at least one polymer is substantially soluble in the liquid medium.

14 Claims, 1 Drawing Sheet

(51) Int. Cl.
  *C08K 3/36* (2006.01)
  *C08K 9/06* (2006.01)
  *C09D 7/40* (2018.01)
  *C09D 7/62* (2018.01)
  *C09D 7/80* (2018.01)
  *C09D 133/06* (2006.01)
  *G02B 1/14* (2015.01)

(52) U.S. Cl.
  CPC ..... *C08L 2205/035* (2013.01); *C08L 2312/06* (2013.01)

(56) References Cited

U.S. PATENT DOCUMENTS

| | | | |
|---|---|---|---|
| 2004/0242729 A1* | 12/2004 | Baran, Jr. | A61K 9/10 523/200 |
| 2006/0234572 A1 | 10/2006 | Wagner et al. | |
| 2007/0282053 A1 | 12/2007 | Wagner et al. | |
| 2009/0004413 A1 | 1/2009 | Wagner et al. | |
| 2010/0221521 A1 | 9/2010 | Wagner et al. | |
| 2016/0130491 A1 | 5/2016 | Park et al. | |
| 2016/0354274 A1 | 12/2016 | Cohn | |
| 2018/0281714 A1 | 10/2018 | Ghandi et al. | |
| 2018/0307141 A1 | 10/2018 | Kwon et al. | |
| 2019/0165314 A1 | 5/2019 | Kim et al. | |
| 2019/0185633 A1 | 6/2019 | Mulzer et al. | |
| 2019/0185710 A1 | 6/2019 | Mulzer et al. | |
| 2019/0338142 A1 | 11/2019 | Hartmann-Thompson et al. | |
| 2020/0361175 A1 | 11/2020 | Gan | |
| 2021/0179795 A1 | 6/2021 | Mori et al. | |

FOREIGN PATENT DOCUMENTS

| | | | | |
|---|---|---|---|---|
| CN | 102926211 A | * | 2/2013 | |
| JP | 2008208342 A | | 9/2008 | |
| JP | 2008214390 A | * | 9/2008 | |
| JP | 2008214390 A | | 9/2008 | |
| WO | WO-2004103231 A1 | * | 12/2004 | ......... A41D 31/0061 |

OTHER PUBLICATIONS

JP-2008214390-A, Sep. 2008, Machine translation (Year: 2008).*
CN-102926211-A, Feb. 2013, Machine translation (Year: 2013).*
CN-1424362-A, Jun. 2003, Machine translation (Year: 2003).*
Handbook of fillers, George Wypych 5th edition, 2021, pp. 221-228 (Year: 2021).*
CN-102719065-A, Oct. 2012, Machine translation (Year: 2012).*
KR20120122387A,, 2012, Machine translation (Year: 2012).*

* cited by examiner

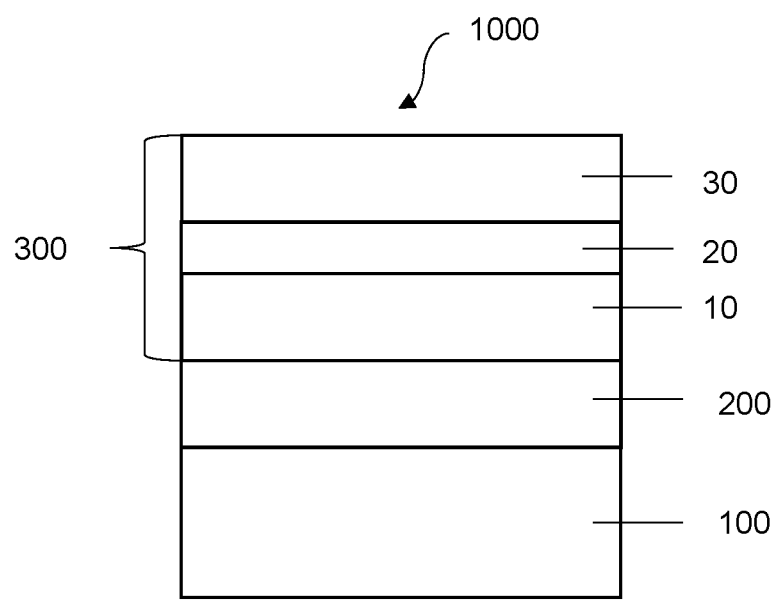

OPTICALLY CLEAR SHEAR THICKENING FLUIDS AND OPTICAL DISPLAY DEVICE COMPRISING SAME

FIELD OF THE DISCLOSURE

The present disclosure relates to an optically clear shear thickening fluid and a protection assembly comprising the optically clear shear thickening fluid. It further relates to use of the optically clear shear thickening fluid in electronic devices, particularly in optical display devices.

BACKGROUND INFORMATION

Many electronic devices include optical display panels for displaying images. Examples of such devices include mobile devices such as smart phones, digital cameras, tablets, laptop computers, navigation systems, and televisions. The optical display panels often have cover windows for protection against scratches, fingerprints, damage from impacts of external force, and the like. For example, the damage can be caused by dropping the electronic devices including optical display panels. Such cover windows contain optically clear films and are attached to the display substrate using optically clear adhesives.

Recently, flexible display devices have been developed and widely used. The flexible display devices employ flexible display panels. Such panels may be bendable, foldable, or rollable. Compared to traditional rigid displays, flexible displays need to significantly reduce the cover window thickness and rigidity to enable the bendable/flexible feature. Polymer films are often used in the cover windows of flexible display devices. As a result, the sensitive components in the display panel beneath the cover window (e.g., organic emissive layers, TFT array, and barrier layers) are more vulnerable to damages from the external shock or impact. The damages include dimples or cracks on the cover window, delamination between individual layers, and pixel damage to the display module, which are all detrimental to the electronic components. The display manufacturers have constantly been looking for an effective impact resistance material that can be used to protect sensitive electronic components beneath the display devices under the impact of external forces.

Shear thickening fluids (STF) are fluids whose viscosity increases with shear rates. In some cases, at high shear rates the STF transforms into a material with solid-like properties. Such materials are fluid and flexible in the absence of shear or low shear rates, but become hard under high shear rates.

Such shear thickening fluids are mainly used to enhance a ballistic protection afforded by fabric-based, flexible body armor by impregnating the shear thickening fluids. The shear thickening fluids are also incorporated into elbow and knee pads for preventing damages to skin and joints due to blunt trauma. In addition, they can be employed in engineering foams, plastics and nanocomposites that are rough and energy absorbent material for uses in sports equipment including bicycle, motorcycle helmet, golf clubs and balls, and athletic shoes; automotive and aircraft.

Recently, such STF materials find utility as protective layers for flexible electronic devices, such as displays. The STF layers are flexible during normal operation, but become hard and protective when the device is exposed to an external force. However, the STF materials are opaque or translucent and not suitable for the viewing area of display devices.

There is a continuing need for optically clear STF materials that can be used in display devices, especially flexible display devices and protect the display devices under impact of external force or shock.

BRIEF DESCRIPTION OF THE DRAWINGS

Embodiments are illustrated in the accompanying FIGURE to improve understanding of concepts as presented herein.

FIG. 1 is a schematic representation of a display device having an optically clear shear thickening fluid of the present disclosure.

Skilled artisans appreciate that objects in the FIGURE are illustrated for simplicity and clarity and have not necessarily been drawn to scale. For example, the dimensions of some of the objects in the FIGURE may be exaggerated relative to other objects to help to improve understanding of embodiments.

DETAILED DESCRIPTION

As used throughout this specification, the following abbreviations shall have the following meanings, unless the context clearly indicates otherwise: ° C.=degree Celsius; g=gram; nm=nanometer; µm=micron=micrometer; mm=millimeter; sec.=second; and min.=minutes. All amounts are percent by weight ("wt. %") and all ratios are molar ratios, unless otherwise noted. All numerical ranges are inclusive and combinable in any order, except where it is clear that such numerical ranges are constrained to added up to 100%. Unless otherwise noted, all polymer and oligomer molecular weights are weight average molecular weights ('Mw") with unit of g/mol or Dalton, and are determined using gel permeation chromatography compared to polystyrene standards.

As used herein, the term "crosslinkable group" refers to a group on a compound or polymer chain that can link to another compound or polymer chain via thermal treatment or exposure to radiation.

The terms "crosslink", "crosslinked", "cure" and "cured" refer to connecting a bond or chain in a compound or polymer and are used interchangeably through this specification.

The term "liquid medium" refers to a material which is a liquid at room temperature (20-25° C.), and can be a pure liquid or a combination of liquids. The term liquid medium is used regardless of whether one or more liquids are present.

The term "optically clear" refers to a material or layer that is visually clear and not hazy.

The term "transmittance" refers to a percentage of light of a given wavelength impinging on a film or layer that passes through the film or layer so as to be detectable on the other side. Light transmittance measurements can be made in the visible region (380 nm to 800 nm).

The term "substantially soluble" means that at least 95%, or at least 96%, or at least 97%, or at least 98%, or at least 99% of a polymer is soluble in a liquid medium, i.e., 5% or less, or 4% or less, or 3% or less, or 2% or less, or 1% or less of the polymer is present in a solid state.

The terms "film" and "layer" are used interchangeably through this specification.

In this specification, unless explicitly stated otherwise or indicated to the contrary by the context of usage, where an embodiment of the subject matter hereof is stated or described as comprising, including, containing, having, being composed of or being constituted by or of certain features or elements, one or more features or elements in addition to those explicitly stated or described may be present in the embodiment. An alternative embodiment of the disclosed subject matter hereof, is described as consisting essentially of certain features or elements, in which embodiment features or elements that would materially alter the principle of operation or the distinguishing characteristics of the embodiment are not present therein. A further alternative embodiment of the described subject matter hereof is described as consisting of certain features or elements, in which embodiment, or in insubstantial variations thereof, only the features or elements specifically stated or described are present.

Also, use of "a" or "an" are employed to describe elements and components described herein. This is done merely for convenience and to give a general sense of the scope of the invention. This description should be read to include one or at least one and the singular also includes the plural unless it is obvious that it is meant otherwise.

Unless otherwise defined, all technical and scientific terms used herein have the same meaning as commonly understood by one of ordinary skill in the art to which this invention belongs. Although methods and materials similar or equivalent to those described herein can be used in the practice or testing of embodiments of the present disclosure, suitable methods and materials are described below. In addition, the materials, methods, and examples are illustrative only and not intended to be limiting.

To the extent not described herein, many details regarding specific materials, processing acts, and circuits are conventional and may be found in textbooks and other sources within the organic light-emitting diode display, photodetector, photovoltaic cell, and semiconductive member arts.

The present disclosure provides an optically clear shear thickening fluid ("STF") comprising a solid nanoparticle having an average particle size equal to or less than 100 nm; at least one polymer; and a liquid medium, wherein the at least one polymer is substantially soluble in the liquid medium.

The at least one polymer is optically clear and colorless. The polymer can be a homopolymer or a copolymer derived from two or more monomers. In some embodiments, the at least one polymer can comprise a crosslinkable group. Examples of the crosslinkable groups can include, but are not limited to, vinyl, hydroxyl, carboxyl, perfluorovinylether, benzocyclobutane such as 1-benzo-3,4-cyclobutane, o-quinodimethane, siloxane, cyanate groups, cyclic ethers such as epoxy, cycloalkenes, acetylenic groups, and combinations thereof.

The at least one polymer having the crosslinkable group can be selected from the group consisting of poly(2-hydroxyethyl acrylate-co-glycidyl methacrylate-co-methacrylic acid), poly(2-hydroxyethyl acrylate-co-glycidyl methacrylate-co-2-carboxyethyl acrylate), poly(2-hydroxyethyl acrylate) partially capped with acrylate functional groups, polyethylene glycol diacrylate, polyethylene glycol dimethacrylate, polyethylene glycol monoacrylate, polyethylene glycol monomethacrylate, a copolymer of 2-hydroxyethyl acrylate, and combinations thereof.

In one embodiment, the copolymer of 2-hydroxyethyl acrylate has a glass transition temperature ($T_g$) less than −20° C. Examples of the monomers used to form the copolymer of 2-hydroxtethyl acrylate can include, but are not limited to, 2-(2-ethoxyethoxy)ethyl (meth)acrylate, phenoxyethyl (meth)acrylate, butyl acrylate, iso-butyl acrylate, isopropyl acrylate, 2-methoxyethyl acrylate, 2-ethoxyethyl acrylate, 2-ethylhexyl methacrylate, iso-decyl acrylate, iso-decyl methacrylate, ethyldiglycol acrylate, heptadecyl acrylate, 4-hydroxybutyl acrylate, 2-hydroxyethyl acrylate, hydroxyethylcaprolactone acrylate, 2-propylheptyl acrylate, lauryl methacrylate, iso-tridecyl methacrylate, n-propyl acrylate, and combinations thereof.

In some embodiments, the at least one polymer comprises two or more polymers. In one embodiment, the at least one polymer comprises a first polymer having a first crosslinkable group and a second polymer having a second crosslinkable group. The first polymer is crosslinked with the second polymer. The first crosslinkable group can be the same as or different from the second crosslinkable group.

In some embodiments, the optically clear shear thickening fluid can further comprise a crosslinking agent that can crosslink the at least one polymer. The crosslinking agent can include, but are not limited to, tetrakis(methoxymethyl) glycoluril; hexamethoxymethyl melamine; polyethylene glycol diglycidyl ether; butane diglycidyl ether; succinic acid; propane tricarboxylic acid; isocyanate such as isophorone diisocyanate and hexamethylene diisocyanate; blocked isocyanate such as Desmodur® BL 3475 BA/SN, Desmodur® PL 340 BA/SN and Desmodur® BL 350 MPA/SN (commercially available from Covestro Deutscheland AG); and combinations thereof.

The at least one polymer crosslinked by a crosslinking agent can include, but are not limited to, poly(2-hydroxyethyl acrylate), poly(2-hydroxyethyl acrylate-co-(me)acrylic acid acrylate), poly(2-hydroxyethyl acrylate-co-2-carboxyethyl acrylate), poly(2-hydroxyethyl acrylate-co-glycidyl methacrylate), and combinations thereof. The crosslinking agent can be present in a range of 5 to 25 wt. %, or 10 to 20 wt. % based on the weight of the polymer.

The at least one polymer can be crosslinked thermally or under radiation. In some embodiments, the at least one polymer can be thermally crosslinked at a temperature less than 250° C., or less than 240° C., or less than 230° C., or less than 220° C., or less than 210° C., or less than 200° C. A crosslinking catalyst can be present to promote the thermal crosslinking. The crosslinking catalyst can be an acid or base. Examples of the crosslinking catalysts can include, but are not limited to, N, N-dimethylbenzylamine, 2-ethylimidazole, 2-ethylhexanoic acid, tetramethyl guanidine, benzyltrimethyl ammonium bromide, benzyltrimethyl ammonium hydroxide, tetrabutyl ammonium hydroxide, chromium(III) 2-ethylhexanoate, cobalt octoate, titanium triethanolamine chelate, zirconium octoate, and combinations thereof.

Examples of the commercial crosslinking catalysts can include, but are not limited to, K-PURE TAG-2678, K-PURE TAG-2713 and K-PURE TAG-2678 (commercially available from King Industries, Inc),

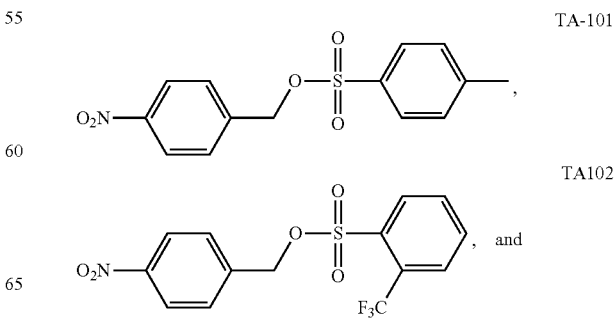

TA-103

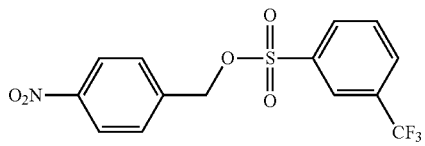

(commercially available from Heraeus Epurio LLC).

In some embodiments, the at least one polymer can be crosslinked under actinic radiation having a peak maximum in a range of from 100 to 600 nm, or from 150 nm to 600 nm, or from 190 nm to 600 nm (ultraviolet to visible light ranges) in the presence of a radical initiator.

The radical initiators can include, but are not limited to, benzophenones, benzils (1,2-diketones), thioxanthones, 2-benzyl-2-dimethylamino-1-[4-(4-morpholinyl)phenyl]-1-butanone, 2,4,6-trimethyl-benzoyl-diphenyl phosphine oxide, 1-hydroxy-cyclohexyl-phenyl-ketone, 2-hydroxy-2-methyl-1-phenyl-1-propanone, oligomeric 2-hydroxy-2-methyl-1-[4-(1-methylvinyl)phenyl]propanones, dihydro-5-(2-hydroxy-2-methyl-1-oxopropyl)-1,1,3-trimethyl-3-(4-(2-hydroxy-2-methyl-1-oxopropyl)phenyl)-1H-indenes, and bis-benzophenones, α-[(4-benzoylphenoxy)-acetyl]-ω-[[2-(4-benzoylphenoxy)-acetyl]oxy]-poly(oxy-1,4-butanediyl)), bis(cyclohexylsulfonyl)diazomethane, bis(tert-butylsulfonyl)diazomethane, bis (4-methylphenylsulfonyl) diazomethane, diphenyl-4-methylphenylsulfonium trifluoromethanesulfonate, diphenyl-2,4,6-trimethylphenylsulfonium p-toluenesulfonate, and combinations thereof.

Suitable radiation can be present, for example, in sunlight or light from artificial light sources. Light sources are not particularly limited and may be appropriately selected depending on the purpose. Both point sources and arrays ("lamp carpets') are suitable. Examples thereof include carbon arc lamps, xenon arc lamps, low medium-, high- and superhigh-pressure mercury lamps, possibly with metal halide dopes (metal-halogen lamps), micro wave-stimulated metal vapor lamps, excimer lamps, super actinic fluorescent tubes, fluorescent lamps, argon incandescent lamps, electronic flashlights, photographic flood lamps, light emitting diodes (LED), electron beams and X-rays. The particular wavelength used will depend on the particular radical initiator(s) used in the STF. Such wavelength selection and light dosages are well within the ability of those skilled in the art. The light dosages used in the present STF can be varied from, 30 to 8,000 mJ/cm², 200 to 8,000 mJ/cm², or from 400 to 6,000 mJ/cm², or from 500 to 5,000 mJ/cm², or from 550 to 3,000 mJ/cm². In one embodiment, a Fusion Systems ultraviolet (UV) belt system device (Heraeus Noblelight American, LLC, Gaithersburg, Md.) equipped with D lamp at a speed of 0.24 m/s is used.

The at least one polymer can be present in an amount of 10-25 wt. %, or 15-20 wt. %, based on the total weight of the STF.

The solid nanoparticles described herein have an average particle size that is 100 nm or less. When the solid nanoparticles are larger than 100 nm, the STF becomes hazy and is not optically clear. In some embodiments, the solid nanoparticles have an average particle size in a range of 5-100 nm, or 10-100 nm, or 20-100 nm, or 30-100 nm, or 40-100 nm, 50-100 nm, or 60-100 nm, or 70-100 nm, or 10-75 nm, or 30-75 nm, or 50-70 nm.

In some embodiments, the solid nanoparticles have a refractive index of 1.3 to 2.0, or 1.3 to 1.8, or 1.3 to 1.7 (measured at 550 nm). In one embodiment, the at least one polymer has the same refractive index as the solid nanoparticles.

The solid nanoparticles can be inorganic or organic nanoparticles. In some embodiments, the organic nanoparticle is selected from the group consisting of hydroxylated vinyl or acrylate polymer, polystyrene, polymethylmethacrylate, polyethylene oxide, and combinations thereof.

In some embodiments, the inorganic nanoparticle is selected from the group consisting of silica, calcium carbonate, iron oxide, kaolin clays, aluminum oxide, and combinations thereof.

In one embodiment, the inorganic nanoparticles can be silica nanoparticles. The silica nanoparticles can be monodisperse uniformed-size silica nanoparticle and synthesized by hydrolysis of tetraethyl orthosilicate (TEOS) in a solvent such as alcohol. The alcohol can be methanol, ethanol, n-propanol, isopropanol, butanol, or mixed alcohols thereof. An acid and base catalyst can be present for the synthesis. The base catalyst can be ammonia. The synthesis of the monodisperse uniformed-size silica nanoparticles is disclosed in Journal of Colloid and Interface Science, 26, 62-29 (1968), which is hereby incorporated by reference in its entirety by reference thereto. The silica nanoparticles in the solvent can be used directly in the optically clear STF fluids.

In some embodiments, the silica nanoparticles can be modified by an organosilicon compound. The organosilicon compound can be an organoalkoxysilane or methallyl silane. The organoalkoxysilane can comprise one, two or three alkoxy group(s) connected to silicon as shown below.

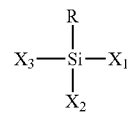

where R is alkyl or aryl; $X_1$-$X_3$ are identical or different and are each independently R or alkoxy. Examples of the organoalkoxylsilane can include, but are not limited to, 3-aminopropryltrimethoxysilane (APTMS), 3-aminopropyltriethoxysilane (APTES), 3-aminopropyltrimethoxyethoxyethoxysilane, 3-aminopropyltriethoxy-methoxyethoxysilane, 3-aminopropyl-methyl-diethoxysilane, N-methyl-3-aminopropyltrimethoxysilane, N-butyl-3-aminopropyltrimethoxysilane, 3-mercaptopropyltrimethoxysilane, 3-mercaptopropyltriethoxysilane, 3-mercaptopropyl-methyldimethoxysilane, aminoethyl-aminopropyl-trimethoxysilane, (3-glycidyloxypropyl)trimethoxysilane), (N-gyclohexylaminomethy)methyldi-ethoxysilane, (N-cyclohexylaminomethyl)triethoxysilane, (N-phenylaminomethyl)methyldimethoxysilane, (N-phenylaminomethyl) trimethoxysilane, N-ethyl-aminoisobutyltrimethoxysilane, 4-amino-3,3-dimethylbutyltrimethoxysilane (3-chloropropyl)trimethoxysilane, (3-glycidyloxypropyl)trimethoxysilane, ethyltriacetoxysilane, triethoxy(isobutyl)silane, triethoxy(octyl)silane, tris(2-methoxyethoxy)(vinyl)silane, phenyltrimethoxysilane, chlorotriethoxysilane, ethylenetrimethoxysilane, 3-acryloxytrimethoxysilane, methyltriomethoxysilane, 8-methacryloxyltrimethoxysilane, or any combination of the above.

In order for the STF to provide sufficient protection for devices when exposed to an external force or impact, the solid nanoparticles can be present in an amount of 50-75 wt. %, based on the total weight of the STF. In some embodiments, the solid nanoparticles can be present in an amount of 50-70 wt. %, or 54-70 wt. %, or 50-60 wt. %, or 60-70 wt. % based on the total weight of the STF.

The liquid medium is optically clear. The liquid medium has the same or close refractive index as the solid nanoparticles, and in which the solid nanoparticles can be dispersed. In one embodiment, the liquid medium has a refractive index of 1.47±0.05 (measured at 550 nm).

In one embodiment, the liquid medium can be selected from the group consisting of alkylene glycols, polyalkylene glycols, glycerol, polyol and combinations thereof. Examples of the liquid medium can include, but are not limited to, ethylene glycol, propylene glycol, polyethylene glycol, and polypropylene glycol.

The amount of liquid medium present is sufficient to disperse the solid nanoparticles and to dissolve the one or more polymers. In some embodiments, the liquid medium can be present in an amount of 25 to 50 wt. %, or 15 to 25 wt. %, based on the total weight of the STF.

In one embodiment, the STF can be prepared by adding the solid nanoparticles and the at least one polymer having a crosslinkable group, or the at least one polymer and a crosslinking agent to the liquid medium; and mixing them together.

In another embodiment, the STF can be prepared by dissolving the at least one polymer having a crosslinkable group, or the at least one polymer and a crosslinking agent into the liquid medium to form a polymer solution. And solid nanoparticles are then added and dispersed into the polymer solution.

The STF of the present disclosure is a viscous liquid prior to the impact of shear stress. In some embodiments, the STF can have a viscosity of 2,000 to 200,000 mPa·s, or 5,000 to 200,000 m·Pa·s, or 10,000 to 200,000 mPa·s, or 15,000 to 200,000 mPa·s, or 20,000 to 150,000 mPa·s, or 50,000 to 100,000 mPa·s without any shear stress.

Any of the above embodiments for the STF can be combined with one or more of the other embodiments, so long as they are not mutually exclusive. The person of ordinary skill in the art would understand which embodiments were mutually exclusive and would thus readily be able to determine the combinations of embodiments that are contemplated by the present application.

The present disclosure is also directed to a protection assembly. The protection assembly comprises a first optically clear layer and a STF disposed on the first optically clear layer. The STF is the same as described previously. In some embodiments, the STF is coated on the first optically clear layer, dried to remove any solvent if existed to form a STF layer. In one embodiment, the STF layer is then crosslinked to form a crosslinked STF layer.

The protection assembly can further comprise a second optically clear layer disposed on the STF layer. In one embodiment, the second optically clear layer can be laminated over the STF layer. Crosslinking can be carried out before or after lamination of the second optically clear layer to form a crosslinked STF layer. In another embodiment, the STF can be sealed between the first and second optically clear layers and then crosslinked. The solvent is removed before sealing.

The first and the second optically clear layers can be made from the same or different materials. Suitable materials can include, but are not limited to, polyimide, polyimide-amide, polyester, polyurethane, polyethylene, polypropylene, polycarbonate, polyethylene terephthalate, polystyrene, polymethylmethacrylate, ethylene-tetrafluoroethylene copolymer, and combinations thereof. In some embodiments, the optically clear layer can have a thickness of 10 to 400 µm, of from 25 to 400 µm, or from 25 to 350 µm, or from 25 to 300 µm, or from 25 to 250 µm, or 30 to 100 µm, or 40 to 75 µm, or 50 to 70 µm.

In some embodiments, a STF layer can have a thickness in a range of 1 to 400 µm, or 3 to 400 µm, or 3 to 350 µm, or 5 to 400 µm, or 5 to 300 µm, or 10 to 400 µm, or 10 to 250 µm, or 20 to 400 µm, or 20 to 200 µm, or 25 to 400 µm, or 25 to 350 µm, 25 to 300 µm, or 25 to 250 µm, or 25 to 200 µm, or 25 to 150 µm, or 5 to 100 µm, or 5 to 50 µm, or 5 to 30 µm, or 5 to 20 µm, or 7 to 25 µm, or 7 to 20 µm, or 7 to 15 µm.

The protection assembly of the present disclosure is transparent and colorless. Optical properties of the protection assembly (transmittance, haze, yellowness index and b*) can be measured with a UV-VIS spectrometer. Yellowness index can be calculated based on the absorbance spectrum between 395 and 700 nm. b* (which correlates to the perceived degree of yellowing) can be calculated based on % Transmittance between 380 to 780 nm.

In the present disclosure, the optical properties of a protection assembly containing a STF layer can be determined by placing the STF layer between two clear polymeric films. The protection assembly may have a haze value of 5% or less, or 3% or less, or 2% or less, or 1% or less. The protection assembly may have a transmittance of at least 80%, or at least 85%, or at least 90%, or at least 93%, or at least 94%, or at least 95%, or at least 97%, or at least 98%, or at least 99%.

The effectiveness of the STF in hardening under shear stress can be determined using a strain-controlled rheometer to measure viscosity of the STF as a function of shear rate. The effectiveness of the STF can also be determined in a poking test. In the poking test a fluid is struck with a plastic pipette at a rate of about 10 sec$^{-1}$. The STF will pass this test if the fluid turns into a solid instantaneously upon the impact. It generally is undesirable for the STF to become solid at a time scale less than 1 sec$^{-1}$.

The present disclosure is further related to a method for making the protection assembly. In some embodiments, the method comprises steps of: (a) providing at least one polymer having a crosslinkable group; (b) dissolving the at least one polymer in a liquid medium to form a polymer solution; (c) dispersing a solid nanoparticle having an average particle size equal to or less than 100 nm into the polymer solution to form an optically clear shear thickening fluid (STF); (d) coating the shear thickening fluid on a first optically clear layer to form a STF layer; and (e) exposing the STF layer to an amount of curing energy to form a cured STF layer.

In some embodiments, the method comprises steps of: (a) providing at least one polymer and a crosslinking agent; (b) dissolving the at least one polymer and the crossing agent in a liquid medium to form a polymer solution; (c) dispersing a solid nanoparticle having an average particle size equal to or less than 100 nm into the polymer solution to form an optically clear shear thickening fluid (STF); (d) coating the shear thickening fluid on a first optically clear layer to form a STF layer; and (e) exposing the STF layer to an amount of curing energy to form a cured STF layer. The crosslinking agent is the same as those describe previously.

The curing energy can include thermal and/or actinic radiation as described previously. In one embodiment, a step (d') can be added prior to the step (e) in the methods described above. The step (d') comprises adding a second optically clear layer on a top surface of the STF layer. In another embodiment, the methods as described above further comprise a step (f) of adding a second optically layer on a top surface of the cured STF layer.

The first and second optically clear layers can be made of the same or different materials, which are described previously. In addition, the STF is the same as those described previously.

The present disclosure is also related to a display device comprising the protection assembly as described above. In some embodiments, the display device can be a flexible display device. An exemplary device is shown in FIG. 1. Device 1000 has a flexible substrate 100, a display panel 200, and a protection assembly 300, where the protection assembly is on the viewing side of the display panel. Protection assembly 300 comprises a first clear flexible film 10, an optically clear STF layer 20, and a second clear flexible film 30. The clear flexible film and STF layer are the same as described previously. Flexible substrate 100 can be a polymeric film or glass layer and are well known in the art. Display panel 200 can be any known type of display. Exemplary display panels can include, but are not limited to LCDs and OLEDs.

EXAMPLES

The concepts described herein will be further described in the following examples, which do not limit the scope of the invention described in the claims. Unless otherwise indicated, all units of temperature are room temperature (20-25° C.) and all units of pressure are standard pressure or 101 kPa.

Materials

ORGANOSILICASOL™MA-ST-ZL: Colloidal silica mono-dispersed nanoparticles with a particle size of 70 to 100 nm in methanol with a solid loading of 30 wt. %, commercially available from Nissan Chemical America Corporation, Houston, Tex.

V65 HP: 2,2'-Azobis(2.4-dimethyl valeronitrile), commercially available from FUJIFILM Wako Pure Chemicals Corporation, Tokyo, Japan.

Preparation of Polymer

Example 1

A copolymer derived from hydroxyethyl acrylate ("HEA"), and glycidyl methacrylate ("GMA") was prepared as follows.

1.6292 g of GMA was mixed with 18.4220 g of HEA and 15.0123 g of isopropyl alcohol ("IPA") in a 40 ml glass vial. The vial was placed in an ice/water bath to reach temperature equilibrium with the bath. 0.6062 g of V65 HP were then added into the vial. The vial was then put into a shaker to dissolve the V65 HP to form a solution. Then the vial was placed back to the bath. The solution was kept in the bath throughout the feeding process to a 100 ml reactor of three-neck round bottom flask. The three necks were respectively connected to a thermal couple, a condenser and a feeding inlet for the solution. The reactor was heated through a heating mantle. The heating mantle sat on a magnetic stirrer for providing stirring to the reactor with a magnetic stirring bar. The reactor was charged with 15.0 g of IPA. The reactor was then heated to 80° C. and maintained at 80° C. The solution was fed into the reactor over 90 minutes. After feeding the solution, the reactor was maintained at 80° C. for two hours. The reactor was then cooled down to 20-25° C. The polymer solution in the reactor was obtained and used directly. The polymer content in the polymer solution was 41.6 wt. %.

Example 2

A copolymer derived from carboxyethyl acrylate ("CEA") and GMA was prepared as follows.

The same procedure as Example 1 was carried out except that the solution was prepared by mixing 2.0223 g of CEA, 18.0062 g of GMA, 14.8159 g of IPA, and 0.6039 g of V65 HP. The polymer content in the polymer solution of the final product was 38.3 wt. %.

Example 3

A copolymer derived from HEA, CEA and GMA is prepared as follows.

The same procedure as Example 1 is carried out except that the solution is prepared by mixing 5.772 g of HEA, 7.16 g of CEA, 7.064 g of GMA, 15 g of IPA, and 0.6 g of V65 HP.

Preparation of a 50 μm Polyimide (PI) Film

Example 4

12.837 kg of trifluromethylbenzidine (TFMB, Seika Corporation, Wakayam Seika Kogyo Co., LTD., Japan) and 107.5 kg of dimethyl acetamide (DMAC) were added to a nitrogen purged 80-gallon reactor while stirring. The solution was stirred to completely dissolve the TFMB in the DMAC solvent, and stirring continuing during all subsequent steps. The reaction mixture was heated to ~40° C. 1.11 kg of biphenyl tetracarboxylic acid dianhydride (BPDA, Mitsubishi Chemical Company, Japan) and 15.079 kg of 4,4'-(hexafluoroisopropylidene)diphthalic anhydride (6FDA, Synasia, Metuchen, N.J.) were added in four separate aliquots over a 6 hours period. Three additional aliquots of 1.831 g of BPDA and 24.881 g of 6FDA were added to the reaction mixture over a period of ~3 hours. The viscosity of the pre-polymer was ~89 poise at 25° C. A portion of the polymer was polymerized ("finished") to ~1200-1300 poise using a mixture of 6 wt. % pyromellitic dianhydride (PMDA) in DMAC in a nitrogen purged reactor. The material was polymerized with the PMDA solution over the course of ~24 hours at 40° C. to form a polyamic acid solution.

The polyamic acid solution was cast onto a moving belt and was dried at an oven temperature in a range of from about 95 to about 150° C. The self-supporting film was peeled from the belt and heated with radiant heaters in a tenter oven at a temperature of from about 110 to about 675° C. (radiant heater surface temperature) to dry and imidize the polymer film. A 50 μm PI film was obtained.

STF, Protection Assembly Preparation and Characterization

Example 5

ORGANOSILICASOL™MA-ST-ZL (MA-ST-ZL), diethylene glycol, and the synthesized copolymers prepared from Examples 1 and 2 were mixed in the amounts listed in Table 1 to form mixtures. Methanol was removed from the mixtures with a rotary evaporator at 30° C. to form liquid STF formulations as Control and Samples 1-3.

TABLE 1

| Samples | Diethylene Glycol wt. % | MA-ST-ZL wt. % | Polymer, wt. % | |
|---|---|---|---|---|
| | | | Example 1 | Example 2 |
| Control | 31.6 | 47.4 | 21.0 | |
| 1 | 27.3 | 54.5 | 18.2 | |
| 2 | 27.3 | 54.7 | | 18.0 |
| 3 | 24.0 | 60.1 | | 15.9 |

The liquid STF formulation prepared from the Control and Samples 1-3 was coated with a drawdown bar coater onto a first 50 μm colorless polyimide film prepared from Example 4 to form a STF layer. A second film of 50 μm colorless polyimide film prepared from Example 4 was placed over the STF layer to form a protection assembly, which was then tested in a poking test at a rate of about 10 $\sec^{-1}$. The results are shown in Table 2.

TABLE 2

| Samples | Shear Thickening Effect | Poking Test |
|---|---|---|
| Control | No | Failed |
| 1 | Significant | Passed |
| 2 | Yes | Failed |
| 3 | Yes | Passed |

Transmittance and haze of the Sample 1 was measured with an Agilent/Hewlett Packard 8453 UV-VIS spectrometer (commercially available from Agilent Technologies Inc, Santa Clara, Calif.). Transmittance was measured between 400 to 800 nm wave lengths. A blank sample containing two 50 μm PI films prepared from Example 4 with diethylene glycol filled in between the two films was baselined to 100% of transmittance from 400 to 800 nm wave lengths. The transmittance of Sample 1 was 94% and the haze was less than 0.84.

Example 6

57.4 wt. % of ORGANOSILICASOL™MA-ST-ZL, 25.7 wt. % of diethylene glycol, 8.5 wt. % of the copolymer prepared from Example 1, and 8.4 wt. % of the copolymer prepared from Example 2 were mixed to form a mixture. Methanol is removed from the mixture with a rotary evaporator at 30° C. to form a liquid STF formulation.

The STF formulation is coated onto a 50 μm PI film prepared from Example 4 and dried to form a STF layer on the PI film. The STF layer along with PI film is baked at 150° C. for 5-15 minutes to form a crosslinked STF layer on the first 50 μm PI film. A second 50 μm PI film prepared from Example 4 is laminated over the crosslinked STF layer to form a protection assembly. The protection assembly passes the poking test at a rate of 10 $\sec^{-1}$.

What is claimed is:

1. An optically clear shear thickening fluid comprising:
   a solid nanoparticle having an average particle size equal to or less than 100 nm;
   at least one polymer; and
   a liquid medium,
   wherein the at least one polymer is substantially soluble in the liquid medium, and wherein the at least one polymer is selected from the group consisting of poly(2-hydroxyethyl acrylate-co-glycidyl methacrylate-co-methacrylic acid), poly(2-hydroxyethyl acrylate-co-glycidyl methacrylate-co-2-carboxyethyl acrylate), poly(2-hydroxyethyl acrylate) partially capped with acrylate functional groups, polyethylene glycol diacrylate, polyethylene glycol dimethacrylate, polyethylene glycol monoacrylate, polyethylene glycol monomethacrylate, a copolymer of 2-hydroxyethyl acrylate, and combinations thereof.

2. An optically clear shear thickening fluid comprising:
   a solid nanoparticle having an average particle size equal to or less than 100 nm;
   at least one polymer;
   a liquid medium; and
   a crosslinking agent selected from the group consisting of tetrakis(methoxymethyl) glycoluril, hexamethoxymethyl melamine, polyethylene glycol diglycidyl ether, butane diglycidyl ether, succinic acid, propane tricarboxylic acid, isocyanate, and blocked isocyanate,
   wherein the at least one polymer is substantially soluble in the liquid medium.

3. The shear thickening fluid of claim 1, wherein the solid nanoparticle has a refractive index of 1.3 to 2.0 and the at least one polymer has the same refractive index as the solid nanoparticle.

4. An optically clear shear thickening fluid comprising:
   a solid nanoparticle having an average particle size equal to or less than 100 nm;
   at least one polymer; and
   a liquid medium,
   wherein the at least one polymer is substantially soluble in the liquid medium; comprises a crosslinkable group selected from the group consisting of hydroxyl, carboxyl, epoxy, acrylate and combinations thereof; and wherein the at least one polymer comprises a first polymer having a first crosslinkable group and a second polymer having a second crosslinkable group, wherein the first polymer is crosslinked with the second polymer.

5. The shear thickening fluid of claim 4, wherein the first polymer having a first crosslinkable group and the second polymer having a second crosslinkable group are crosslinked at a temperature below 250° C.

6. The shear thickening fluid of claim 4, wherein the first polymer having a first crosslinkable group and the second polymer having a second crosslinkable group are ultraviolet (UV) crosslinked.

7. The shear thickening fluid of claim 1, wherein the liquid medium is selected from the group consisting of alkylene glycols, polyalkylene glycols, glycerol, polyol and combinations thereof.

8. The shear thickening fluid of claim 1, wherein the solid nanoparticles are inorganic or organic nanoparticles.

9. The shear thickening fluid of claim 8, wherein the inorganic nanoparticle is selected from the group consisting of silica, calcium carbonate, iron oxide, kaolin clays, aluminum oxide, and combinations thereof.

10. The shear thickening fluid of claim 9, wherein the silica nanoparticle is a monodisperse uniformed-size silica nanoparticle made by hydrolysis of tetraethyl orthosilicate in alcohol.

11. The shear thickening fluid of claim 10, wherein the silica nanoparticle is modified by an organosilicon compound of organoalkoxysilane or methallyl silane.

12. The shear thickening fluid of claim 1, wherein the solid nanoparticle has an average particle size of 20 to 100 nm.

13. A protection assembly comprising a first optically clear layer and the shear thickening fluid of claim 1 disposed on the first optically clear layer.

14. The protection assembly of claim 13, further comprising a second optically clear layer disposed on the shear thickening fluid.

* * * * *